(12) United States Patent
Corris et al.

(10) Patent No.: US 6,374,608 B1
(45) Date of Patent: Apr. 23, 2002

(54) SHAPE MEMORY ALLOY WIRE ACTUATOR

(76) Inventors: Charles James Corris, 26950 Ckem Rd., Elkmont, AL (US) 35620; Daniel Keith Dyess, 2010 HighPointe Dr., Apt. 240, Brandon, MS (US) 39042

( * ) Notice: Subject to any disclaimer, the term of this patent is extended or adjusted under 35 U.S.C. 154(b) by 0 days.

(21) Appl. No.: 09/798,919

(22) Filed: Mar. 6, 2001

(51) Int. Cl.$^7$ .................................................. F01B 29/10
(52) U.S. Cl. ........................................... 60/528; 60/527
(58) Field of Search ................................... 60/527, 528

(56) References Cited

U.S. PATENT DOCUMENTS

| | | | |
|---|---|---|---|
| 4,439,987 A | * | 4/1984 | Rideout, Jr. ............... 60/527 X |
| 4,524,343 A | * | 6/1985 | Morgan et al. ........... 60/527 X |
| 4,945,727 A | | 8/1990 | Whitehead et al. |
| 4,965,545 A | | 10/1990 | Johnson |
| 5,079,920 A | | 1/1992 | Whiehead et al. |
| 5,211,371 A | * | 5/1993 | Coffee ...................... 60/527 X |
| 5,345,963 A | | 9/1994 | Dietiker |
| 5,396,769 A | * | 3/1995 | Brudnicki ................. 60/527 X |
| 5,821,664 A | | 10/1998 | Shahinpoor |
| 6,016,096 A | | 1/2000 | Barnes et al. |
| 6,049,267 A | | 4/2000 | Barnes et al. |

* cited by examiner

Primary Examiner—Hoang Nguyen (57) ABSTRACT

A shape memory alloy wire actuator includes a first body member, a second body member and a strand of shape memory alloy wire. The first body member and the second body member extend along a longitudinal axis and are slidably engageable with one another along the longitudinal axis. The first and second body members move in a linear, coaxial fashion relative to one another between an extended state and a contracted state. The first and second body members are resiliently biased away from one another by a spring. The strand of shape memory alloy wire interconnects the first and second body members in a serpentine manner. When the shape memory alloy wire is energized, such as by an electrical current, the shape memory alloy wire shortens causing the first body member and the second body member to move from the extended state to the contracted state. When the shape memory alloy wire is de-energized, i.e., the electrical current is shut off, the shape memory alloy wire lengthens causing the first body member and the second body member move from the contracted state to the extended state under the force of the spring.

23 Claims, 5 Drawing Sheets

SHAPE MEMORY ALLOY WIRE ACTUATOR

FIELD OF THE INVENTION

The present invention relates to an actuator and more particularly to a shape memory alloy wire actuator.

BACKGROUND OF THE INVENTION

Shape memory alloys have been known and utilized for many years with various types of actuator devices. One example of such an actuator device is the hydraulic shape memory alloy actuator described in U.S. Pat. No. 4,945,727 to Whitehead et al. The hydraulic shape memory alloy actuator of Whitehead et al. includes a uniaxial shape memory alloy wire constructed of Nitinol and uses a pair of hydraulic cylinders in fluid communication with one another. Each cylinder contains a hydraulic piston. A first hydraulic piston is moved from a first position to a second position when the shape memory alloy wire, connected at one end of the first hydraulic piston and connected at the other end to a fixed point, changes from a martensitic state to an austenitic state upon heating. The second hydraulic piston responds to the movement of the first hydraulic piston by moving from a rest position to an operating position. Upon cooling the wire to change it from the austenitic state back to the martensitic state, the first piston returns to its original position, with a spring provided to return the second piston to its rest position.

Another example of a shape memory alloy wire actuator is disclosed in U.S. Pat. No. 5,345,963 to Dietiker. The Dietiker patent discloses an electrically controlled modulating pressure regulator with a shape memory alloy actuator. A main valve regulates fluid flow between an inlet and an outlet in response to a control pressure produced by a servo valve which is responsive to an outlet pressure and a force applied by a regulator spring to a diaphragm carrying a servo valve closure element. Deformation of the regulator spring can be varied by an electrical current. The regulator spring is in the form of a wire segment of a shape memory alloy through which the electric current passes to vary its temperature and length.

U.S. Pat. No. 6,049,267 to Barnes et al. teaches an adaptive control module using a shape memory alloy in the form of a shape memory alloy electrical switch or relay. The shape memory alloy electrical module includes a strand of shape memory alloy having a first portion and a second portion, a switching leg, first and second electrical contacts, first and second electrical paths and an adaptive control device. The switching leg is coupled to the first and second portions of the shape memory alloy and has first and second positions. The second electrical contact is connected to the switching leg and is electrically isolated from the first electrical contact when the leg is in the first position and is disposed to be electrically connected to the first electrical contact when the leg is in the second position. The first electrical path applies an electrical current through the first shape memory alloy portion and the second electrical path applies an electrical current through the second shape memory alloy portion. The adaptive control device affects movement of the switching leg from the first position to the second position and from the second position to the first position.

U.S. Pat. No. 4,965,545 to Johnson discloses a shape memory alloy rotary actuator. The rotary actuator has a differential pulley pair interconnected by a shape memory alloy wire. The shape memory alloy wire is thermally cycled through its phase change transition temperature and contracts. The tension forces applied by the ends of the wires to opposite sides of the pulley pair result in a net torque which causes relative rotation between the pulley pair and a reference base. A large mechanical advantage of the differential pulley converts a large force working through small distance into a relatively large angular rotation.

OBJECTS AND SUMMARY OF THE INVENTION

It is an object of the present invention to provide a shape memory alloy wire actuator that is simple to manufacture and simple to assemble.

Another object of the invention is to provide a shape memory alloy wire actuator that can be modified to increase or decrease its pulling force by correspondingly increasing or decreasing the number of alloy wire segments forming a serpentine configuration between the body members which move relative to each other.

Accordingly, the shape memory alloy wire actuator of the present invention is hereinafter described. The shape memory alloy wire actuator includes a first body member, a second body member and a strand of shape memory alloy wire. The first body member and the second body member extend along a longitudinal axis and are slidably engageable with one another along that longitudinal axis. The first and second body members move in a linear fashion relative to one another between an extended state and a contracted state. In the extended state, the first and second body members are resiliently biased apart from one another and, in the contracted state, the first and second body members are displaced towards each other. The strand of shape memory alloy wire interconnects the first and second body members in a serpentine manner. As used herein, the term "serpentine" describes a sinuous, back-and-forth stranding arrangement of the strand of shape memory alloy wire between the body members. When the shape memory alloy wire is energized or activated, such as by an electrical current, the shape memory alloy wire shortens or contracts causing the first body member and the second body member to move from the extended state to the contracted state. When the shape memory alloy wire is de-energized or deactivated, i.e., the electrical current is removed or shut off, the shape memory alloy wire lengthens causing the first body member and the second body member move from the contracted state to the extended state.

The foregoing and other objects, advantages and features of the invention will become more readily apparent and understood from a consideration of the following detailed description of the exemplary embodiments of the invention when taken together with the accompanying drawings, wherein:

DETAILED DESCRIPTION OF THE EXEMPLARY EMBODIMENTS

A first exemplary embodiment of a shape memory alloy wire actuator 10 of the invention is shown in FIGS. 1–5C and includes a first body member 12, a second body member 14 and a strand of shape memory alloy wire 16. The first body member 12 and the second body member 14 extend along a longitudinal axis L and are slidably engageable (FIGS. 3A–4B) with one another along the longitudinal axis L for linear, coaxial movement relative to one another. As the first and second body members 12 and 14 move coaxially relative to one another, the first and second body members 12 and 14 move between an extended or "open" state illustrated in FIGS. 2–3B and a contracted or "closed" state illustrated in FIGS. 4A–4B. In the extended state, as best shown in FIGS. 3A and 3B, the first and second body members 12 and 14 are resiliently biased apart from one another at a distance d. In the contracted state, as best shown in FIGS. 4A and 4B, the first and second body members 12 and 14 are displaced towards each other the distance d so as to be in contact with one another.

Figure 2:
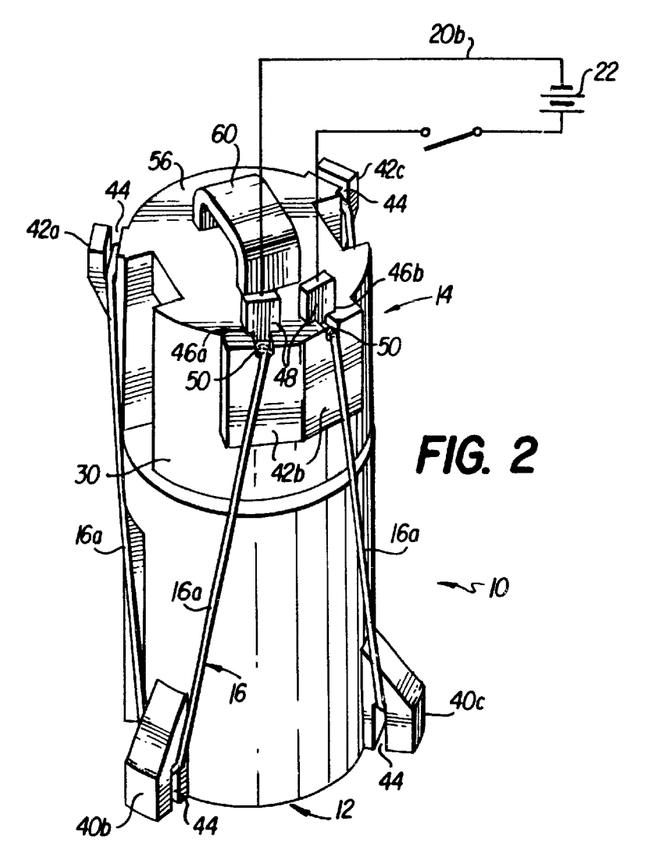
FIG. 2 is a perspective view of the shape memory alloy wire actuator of the invention in FIG. 1 fully assembled and connected to an energy source.
Figure 3A:
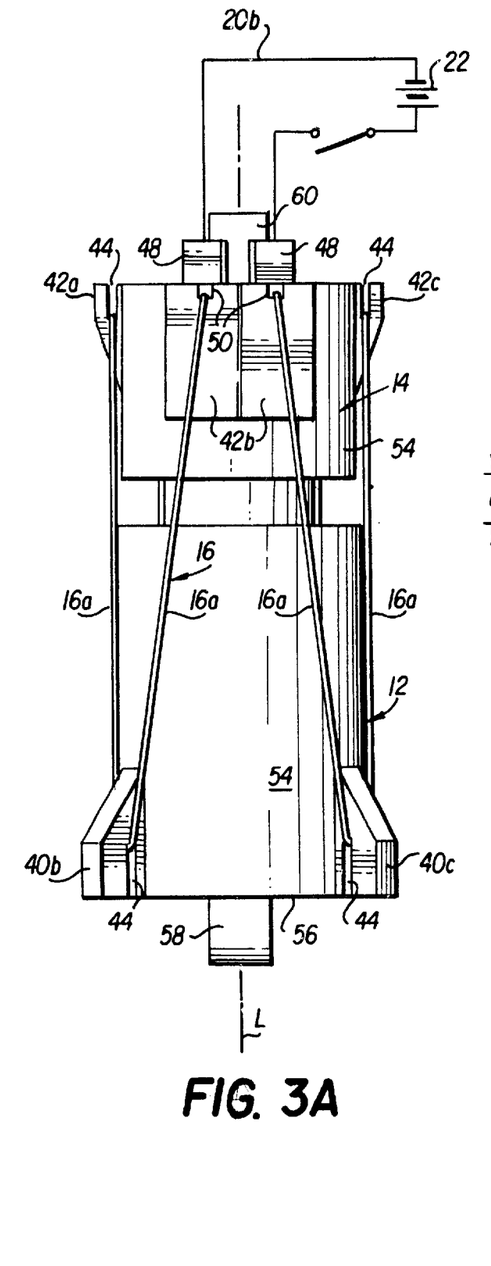
FIG. 3A is a side elevational view of the shape memory alloy wire actuator of the invention in an extended or "open" state.
Figure 3B:
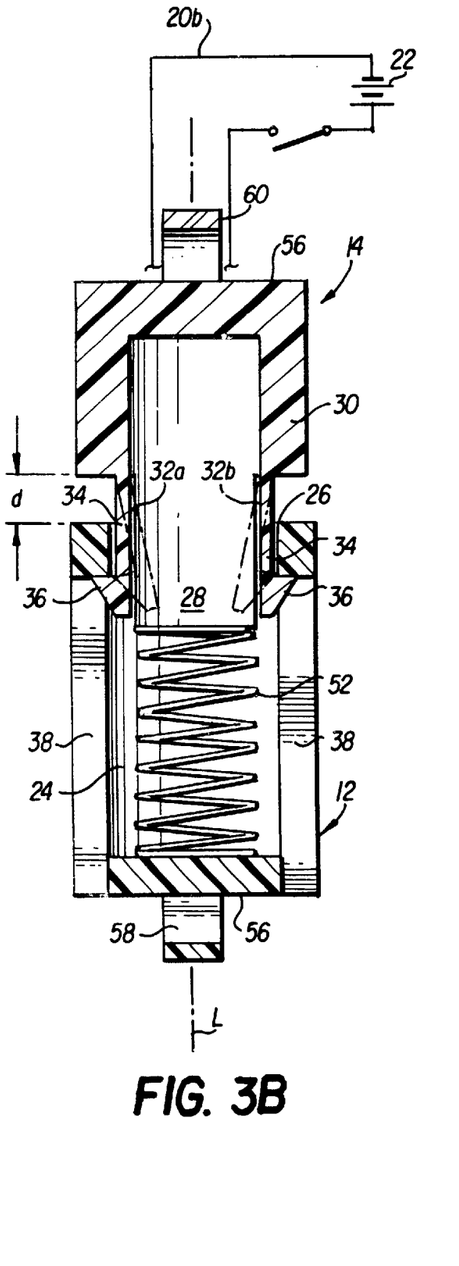
FIG. 3B is a side elevational view in cross-section of the shape memory alloy wire actuator of the invention in the extended state.
Figure 4A:
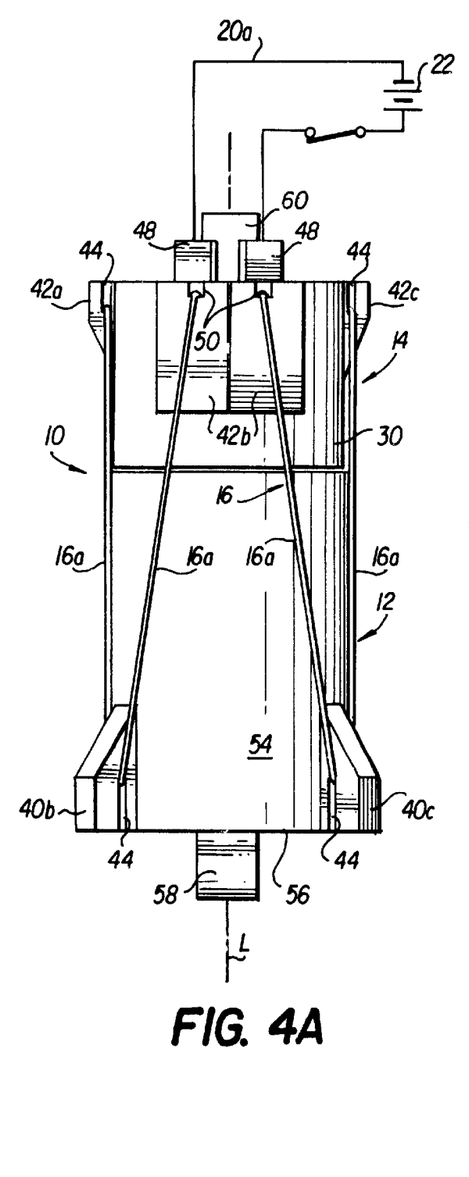
FIG. 4A is a side elevational view of the shape memory alloy wire actuator of the invention in a contracted or "closed" state.
Figure 4B:
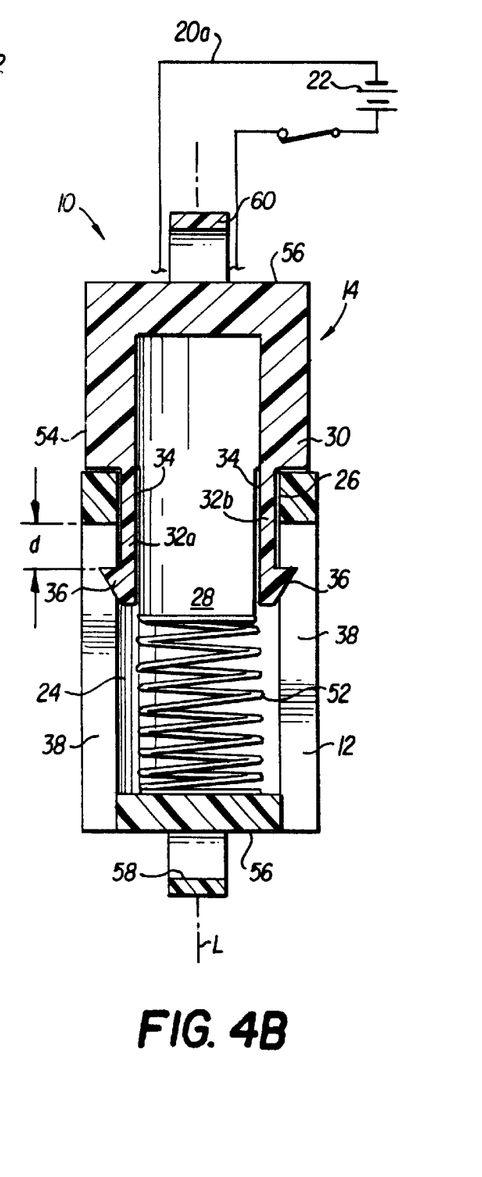
FIG. 4B is a side elevational view in cross-section of the shape memory alloy wire actuator of the invention in the contracted state.

As best shown in FIGS. 2, 3A and 4A, the strand of shape memory alloy wire 16 interconnects the first and second body members 12 and 14, when slidably engaged, in a serpentine manner. As such, when the shape memory alloy wire 16 is energized, for example, by an electrical current provided by a closed electrical circuit 20a from an electrical source, such as a battery 22 (FIGS. 4A and 4B), the shape memory alloy wire 16 contracts or shortens causing the first body member 12 and the second body member 14 to move from the extended or open state (FIGS. 2–3B) to the contracted or closed state (FIGS. 4A and 4B). When the shape memory alloy wire 16 is de-energized, for example, by opening electrical circuit 20b to battery 22 (FIGS. 3A and 3B), the shape memory alloy wire 16 lengthens thereby causing the first body member 12 and the second body member 14 to move from the contracted state (FIGS. 4A and 4B) to the extended state (FIGS. 2–3B).

Figure 1:
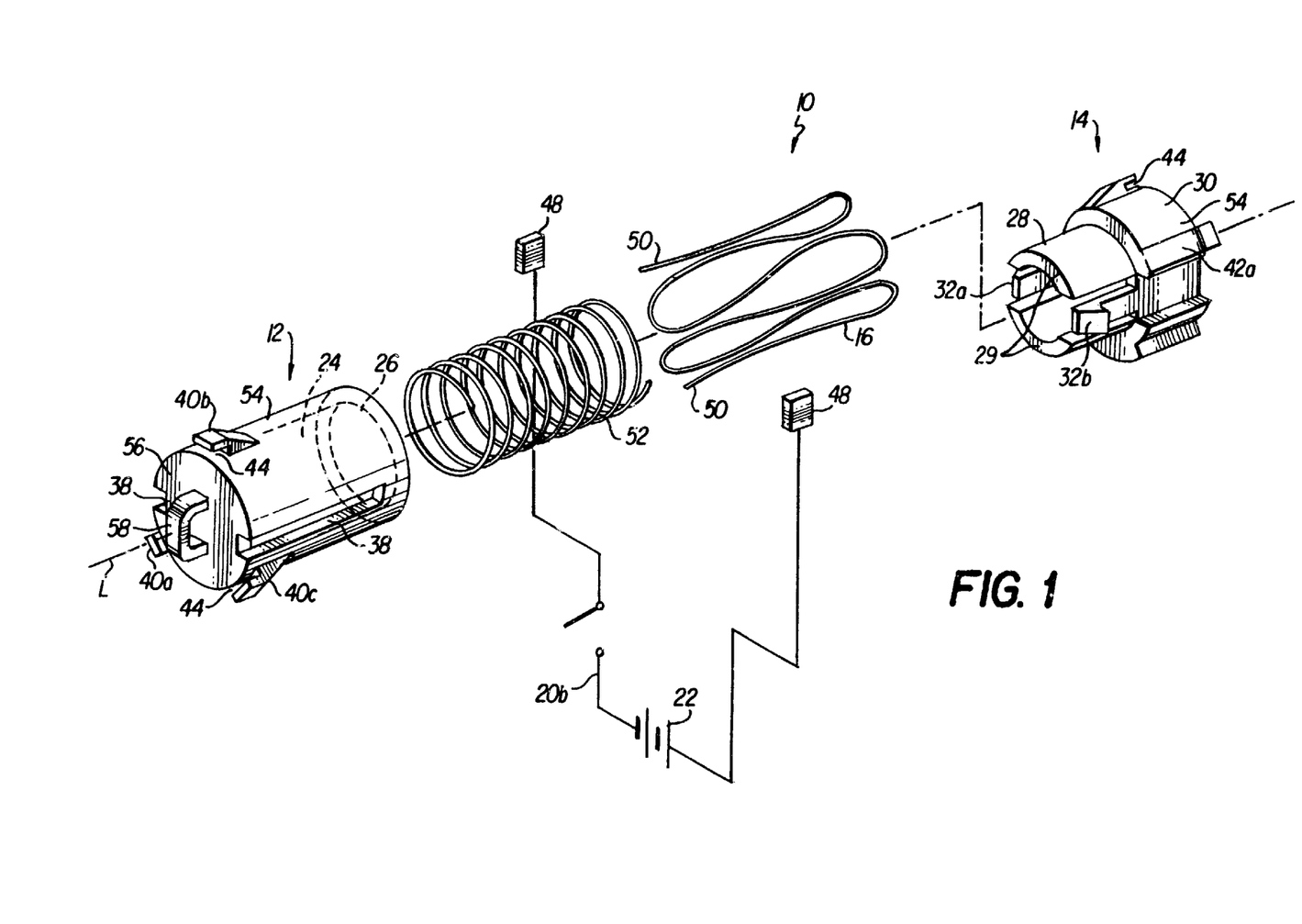
FIG. 1 is an exploded perspective view of a first exemplary embodiment of a shape memory alloy wire actuator of the invention.

As shown in FIGS. 1, 3B and 4B, the first body member 12 defines a cavity 24. The first body member 12 also has an opening 26 into the cavity 24. The cavity 24 and the opening 26 are disposed coaxially along longitudinal axis L. Also, as shown in FIGS. 1, 3B and 4B, the second body member 14 includes a longitudinally extending neck portion 28 and a longitudinally extending head portion 30. The neck portion 28 is sized and adapted to be received in the opening 26 and into the cavity 24 in a close fitting relationship. One function of the neck portion 28 of the second body member 14 is to insure slidable yet linear, coaxial movement between the first and second body members. Although not by way of limitation, the neck portion 28 includes a pair of oppositely disposed arcuate segments 29 as best shown in FIG. 1. The head portion 30 is sized larger than the neck portion 28 for reasons discussed below.

Additionally, the neck portion 28 includes a pair of latches 32a and 32b. The pair of latches 32a and 32b are disposed opposite one another and are operative in conjunction with the first body member 12 to releasably connect the first and second body members 12 and 14 together. Although not by way of limitation, each latch 32a and 32b is integrally formed as a unitary construction with the second body member 14. With this unitary construction, one of ordinary skill in the art will appreciate that each latch 32a and 32b is formed as a so-called living hinge with the second body member 14. As shown in FIGS. 3B and 4B, each latch 32a and 32b has a leg 34 and a foot 36. Each leg 34 extends generally parallel with the longitudinal axis L when the respective latch 32a or 32b is in a normal state illustrated by the solid-line drawing. Also, each leg 34 is bendable from the normal state as illustrated in dash-dot lines in FIG. 3B. Specifically, each leg 34 bends angularly and radially inwardly towards the longitudinal axis L in a resiliently biased manner towards the normal state when either connecting the first and second body members 12 and 14 together or disconnecting the first and second body members 12 and 14 from one another.

Again, with reference to FIGS. 3B and 4B, each foot 36 is distally connected to a respective leg 34. Note particularly in FIGS. 1, 3B and 4B, the first body member 12 includes a pair of channels or slots 38 which are formed into the first body member 12 within the cavity 24 diametrically opposite one another. Each channel 38 extends parallel with the longitudinal axis L and is sized and adapted to receive a respective foot 36 for its slidable movement in the channel 38. When the first and second body members 12 and 14 are in the fully extended state as shown in FIGS. 3A and 3B, each foot 36 engages the first body member 12 thereby preventing further coaxial relative movement between the first and second body members 12 and 14 away from one another. This prevents the possibility of overstressing the shape memory alloy wire which could cause permanent deformation of the wire. When the first and second body members 12 and 14 are in the contracted state as shown by FIGS. 4A and 4B, the head portion 30 of the second body member 14 and the first body member 12 abut one another thereby preventing further coaxial relative movement between the first and second body members 12 and 14 towards one another.

Figures 5A, 5B, 5C:
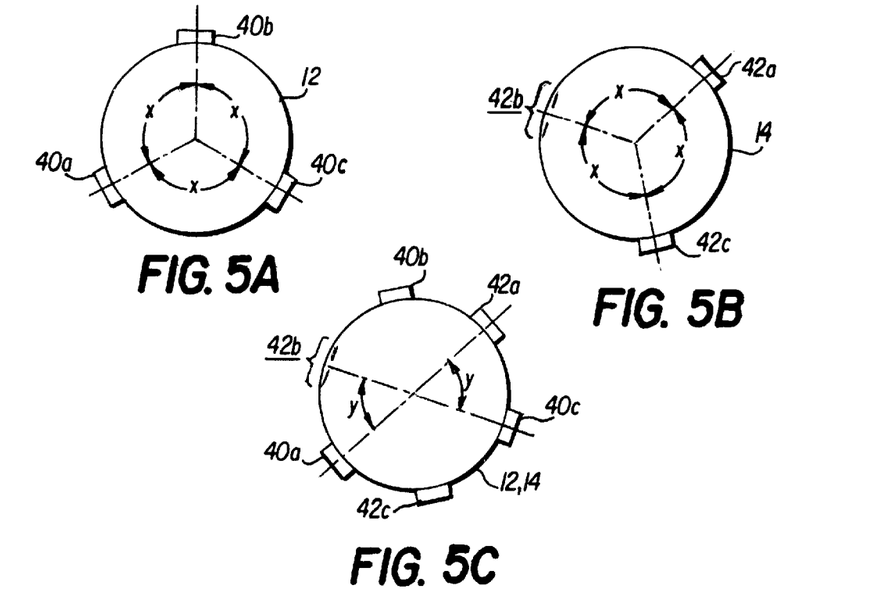
FIG. 5A is a schematic view of a first body member of the shape memory alloy wire actuator of the invention illustrating relative positions of first wire catches connected thereto.
FIG. 5B is a schematic view of a second body member of the shape memory alloy wire actuator of the invention illustrating relative positions of second wire catches connected thereto.
FIG. 5C is a schematic view of the first and second body members of FIGS. 5A and 5B superimposed upon one another illustrating the relative positions of sequential ones of the first and second wire,catches.

As illustrated in FIGS. 1–3A, 4A and 5A, the first body member 12 includes a plurality of first wire catches 40a, 40b, 40c and the second body member 14 includes a plurality of second wire catches 42a, 42b, 42c. The plurality of first wire catches 40a–40c are disposed peripherally on the first body member 12 about the longitudinal axis L and the plurality of second wire catches 42a–42c are disposed peripherally on the second body member 14 about the longitudinal axis L. As best shown in FIGS. 5A and 5B, sequential ones of the first wire catches 40a–40c are disposed equiangularly apart from one another at a respective angle x while sequential ones of the second wire catches 42a–42c are disposed equiangularly apart from one another also at an angle x. A skilled artisan will appreciate that having three wire catches on each one of the first and second body members, angle x is equal to 120°.

In FIG. 5C, the first and second body members 12 and 14 are superimposed upon one another to illustrate the preferred relationship between respective sequential ones of the first wire catches 40a–40c and the second wire catches 42a–42c. More particularly, in cross-section, the sequential ones of the first wire catches 40a–40c and the sequential ones of the second wire catches 42a–42c are disposed angularly offset from one another at an angle y. A skilled artisan would appreciate that having three wire catches on each one of the first and second body member, angle y is equal to 60°. Angularly spacing the wire catches in this manner is preferable, but not required to practice the present invention.

By way of example only, all of the first wire catches 40a–40c and two of the second wire catches 40a and 40c are generally parallelepiped and project radially outwardly from the respective body members. Furthermore, each one of the generally parallelepiped wire catches includes a slot 44 as best shown in FIG. 2. Each slot 44 is sized and adapted to receive a segment of the shape memory alloy wire 16 so that the shape memory alloy wire can be bent around the wire catches and connected to and between the first and second body members 12 and 14 in a generally serpentine configuration. In this first exemplary embodiment of the shape memory alloy wire actuator 10 of the invention, there are six working shape memory alloy wire segments 16a that are connected to and between the first and second body members 12 and 14, one working shape memory alloy wire segment 16a interconnecting sequentially offset ones of the first and second wire catches.

The second wire catch 42b on the second body member 14 is configured differently than the other wire catches. However, one of ordinary skill in the art will appreciate that any other one of the first or second wire catches can be configured in this manner. The second wire catch 42b comprises a pair of rectangular holes 46a and 46b formed longitudinally in the second body member 14 as best shown in FIG. 2. The pair of holes 46a and 46b are electrically isolated from one another and each hole 46a and 46b is sized and adapted to slidably receive and retain a respective one of a pair of electrically conductive terminals 48. In FIG. 1, the strand of shape memory alloy wire 16 has opposite free ends 50. The free ends 50 of the shape memory alloy wire 16 are electrically connected to respective ones of the terminations 48 in any suitable manner known in the art, such as by soldering. Now, the electrical circuit 20a or 20b can be connected to the shape memory alloy wire actuator 10 of the invention at the respective terminations 48 as known in the art for respectively energizing or de-energizing the same.

Further, the shape memory alloy wire actuator 10 of the invention includes a spring 52. As mentioned above, when slidably engaged, the first and second body members 12 and 14 are resiliently biased apart from one another. Although not by way of limitation, the spring 52 provides this biasing function. Further, the spring 52 is sized and adapted to be received within the cavity 24 with one end in contact with the first body member 12 and the other end in contact with the end surfaces of the arcuate segments 29 of head portion 30 of the second body member 14 when the first and second body members 12 and 14 are slidably engaged with one another.

Preferably, the first and second body members 12 and 14 are generally cylindrically shaped. However, one of ordinary skill in the art would appreciate that the generally cylindrical shape of the exemplary embodiments of the invention is shown by way of example only and that other configurations, such as square, rectangular or oval, can be used without departing from the spirit and scope of the invention. Each one of the first and second body members 12 and 14 has a respective outer peripheral surface 54, 55 that surrounds the longitudinal axis L and a respective end surface 56, 57. It is further preferred that a first anchor element 58 is connected to the end surface 56 of the first body member 12 and a second anchor element 60 is connected to the end surface 57 of the second body member 14 as shown in FIG. 3A. It is preferred that the first and second anchor elements 58 and 60 comprise eyelets that can be used for operably connecting the shape memory alloy wire actuator 10 of the invention to and between a device required to be activated and a fixed base. Further, it is preferred that the wire catches are integrally connected in a unitary construction to the outer peripheral surfaces 54, 55 of the first and second body members 12 and 14 adjacent the end surfaces 56, 57.

Figure 6A:
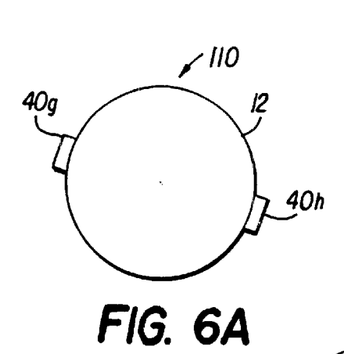
FIG. 6A is a schematic view of a first body member of a second exemplary embodiment of the shape memory alloy wire actuator of the invention illustrating relative positions of first wire catches connected thereto.
Figure 6B:
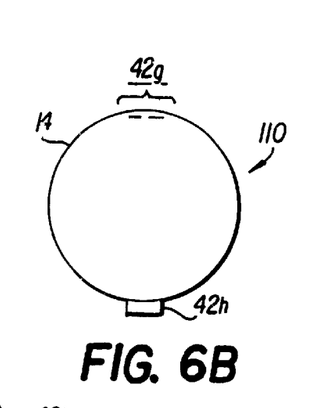
FIG. 6B is a schematic view of a second body member of the second exemplary embodiment of the shape memory alloy wire actuator of the invention illustrating relative positions of second wire catches connected thereto.
Figure 6C:
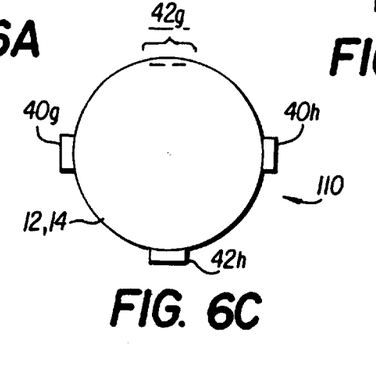
FIG. 6C is a schematic view of the first and second body members of FIGS. 6A and 6B superimposed upon one another illustrating the relative positions of sequential ones of the first and second wire catches.

FIGS. 6A–6C schematically represent a second exemplary embodiment of a shape memory alloy wire actuator 110 of the invention. As shown in FIG. 6A, the first body member 12 includes two first wire catches 40g and 40h. As shown in FIG. 6B, the second body member 14 includes two second wire catches 42g and 42h. When the first and second body members 12 and 14 of the second exemplary embodiment of the shape memory alloy wire actuator 110 of the invention are superimposed over one another as represented in FIG. 6C, the shape memory alloy wire actuator 110 has four wire catches. As a result, there are four working shape memory alloy wire segments that are interconnected between the first and second body members at sequential offset ones of the first and second wire catches.

Figure 7A:
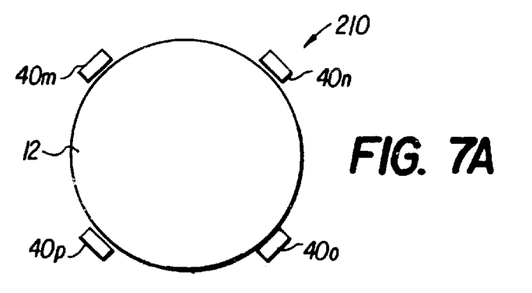
FIG. 7A is a schematic view of a first body member of a third exemplary embodiment of the shape memory alloy wire actuator of the invention illustrating relative positions of first wire catches connected thereto.
Figure 7B:
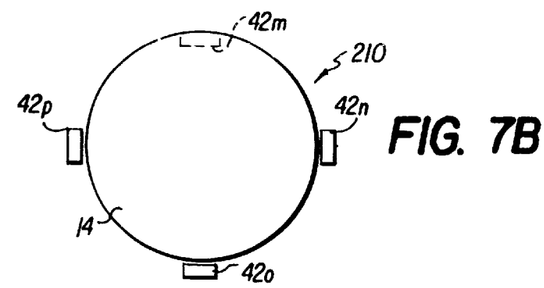
FIG. 7B is a schematic view of a second body member of the third exemplary embodiment of the shape memory alloy wire actuator of the invention illustrating relative positions of second wire catches connected thereto.
Figure 7C:
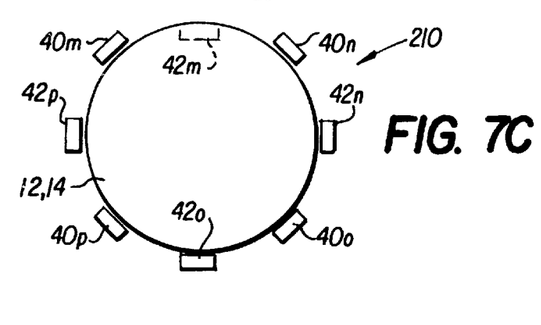
FIG. 7C is a schematic view of the first and second body members of FIGS. 7A and 7B superimposed upon one another illustrating the relative positions of sequential ones of the first and second wire catches.

FIGS. 7A–7C schematically represent a third exemplary embodiment of a shape memory alloy wire actuator 210 of the invention. As shown in FIG. 7A, the first body member 12 includes four first wire catches 40m, 40n, 40o, 40p. As shown in FIG. 7B, the second body member 14 includes four second wire catches 42m, 42n, 42o, 42p. When the first and second body members 12 and 14 of the second exemplary embodiment of the shape memory alloy wire actuator 210 of the invention are superimposed over one another as represented in FIG. 7C, the shape memory alloy wire actuator 210 has eight wire catches. As a result, there are eight working shape memory alloy wire segments that are interconnected between the first and second body members at sequential offset ones of the first and second wire catches.

The first exemplary embodiment of the shape memory alloy wire actuator which has six working shape memory alloy wire segments provides a pulling force when the first and second body members move from the extended state to the contracted state greater than a pulling force of the second exemplary embodiment which has four working shape memory alloy wire segments. By contrast, the first exemplary embodiment of the shape memory alloy wire actuator which has six working shape memory alloy wire segments provides a pulling force when the first and second body members move from the extended state to the contracted state less than a pulling force of the third exemplary embodiment which has eight working shape memory alloy wire segments. To understand why this is so, a single working shape memory alloy wire segment must be analyzed. When energized, the single working shape memory alloy wire segment connected to and between respective ones of the first and second wire catches shortens which, in turn, causes a pulling force between the first and second wire catches. With two single working shape memory alloy wire segments, the pulling force is twice the pulling force of a single segment. With four, the pulling force is four times the pulling force of the single segment. With six, the pulling force is six times the pulling force of the single segment. With eight, the pulling force is eight times the pulling force of the single segment. Thus, increasing or decreasing the number of working shape memory alloy wire segments and wire catches correspondingly increases or decreases the pulling force of the shape memory alloy wire actuator of the invention. Moreover, increasing the number of segments using a single long length of wire rather than using a plurality of shorter, individually electrically connected wire segments results in a higher total electrical resistance. Thus, the shape memory alloy wire actuator of the invention can supply the mechanical force of a plurality of short lengths of wire with the higher electrical resistance of a single long length of wire thereby requiring less current.

Furthermore, the shape memory alloy wire actuator of the invention is simple to manufacture and easy to assemble. Also, a skilled artisan would appreciate that the shape memory alloy wire actuator of the invention can be energized by other sources of energy, such as for example, radiant, conductive or convective heat.

It is contemplated by the present invention that a plurality of at least three segments of the shape memory alloy wire strand are strung between the body members up to a greater number of segments that is practical for a particular actuator design, which may exceed the eight segments shown in the embodiment of FIGS. 7A–7C.

Although certain presently preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A shape memory alloy wire actuator, comprising:
a first body member and a second body member extending along a longitudinal axis, the first and second body members slidably engageable with one another along the longitudinal axis for coaxial movement relative to one another between an extended state and a contracted state; and
a strand of shape memory alloy wire interconnecting the first and second body members in a serpentine manner such that, when the shape memory alloy wire is energized, the shape memory alloy wire shortens causing the first body member and the second body member to move from the extended state to the contracted state, and when the shape memory alloy wire is de-energized, the shape memory alloy wire lengthens causing the first body member and the second body member to move from the contracted state to the extended state.

2. The shape memory alloy wire actuator according to claim 1, including a resilient member disposed between the first and second body members.

3. The shape memory alloy wire actuator according to claim 2, wherein the first body member defines a cavity, an opening into the cavity, the cavity and the opening being coaxial with the longitudinal axis, the second body member including a head portion and a neck portion, the neck portion being sized and adapted to be received in the opening and the cavity in a close fitting relationship for slidable movement within the cavity.

4. The shape memory alloy wire actuator according to claim 3, wherein the neck portion includes a pair of latches operative to releasably connect the first and second body members together for relative coaxial movement.

5. The shape memory alloy wire actuator according to claim 4, wherein each latch is integrally and bendably formed with the second body member, each latch having an leg extending generally parallel to the longitudinal axis and being resiliently bendable radially inwardly towards the longitudinal axis when the first and second body members are connected together or disconnected from one another.

6. The shape memory alloy wire actuator according to claim 5, wherein each latch includes a foot distally connected to the leg, the first body member including a pair of oppositely disposed channels formed in the first body member within the cavity and extending parallel to the longitudinal axis, each channel sized and adapted to receive a respective foot for slidable movement therein, each channel and foot forming a stop for preventing relative movement separating the first and second body members.

7. The shape memory alloy wire actuator according to claim 3, wherein, when the first and second body members are in the contracted state, the head portion of the second body member and the first body member contact one another in an abutting relationship.

8. The shape memory alloy wire actuator according to claim 3, wherein the resilient member comprises a spring sized and adapted to be received within the cavity and in contact with the first body member and the neck portion of the second body member.

9. The shape memory alloy wire actuator according to claim 1, wherein the first body member includes a plurality of first wire catches disposed on the first body member and the second body member includes a plurality of second wire catches disposed on the second body member, the strand of shape memory alloy wire interconnecting the first and second body members between the first and second wire catches.

10. The shape memory alloy wire actuator according to claim 9, wherein sequential ones of the first wire catches are disposed equiangularly apart from one another and sequential ones of the second wire catches are disposed equiangularly apart from one another, the first wire catches being angularly offset from the second wire catches.

11. The shape memory alloy wire actuator according to claim 9, wherein at least one of the first and second wire catches includes a slot sized and adapted to receive a segment of the shape memory alloy wire.

12. The shape memory alloy wire actuator according to claim 9, wherein at least one of the plurality of the first wire catches projects radially outwardly from the first body member and at least one of the plurality of the second wire catches projects radially outwardly from the second body member.

13. The shape memory alloy wire actuator according to claim 9, wherein at least one of the first wire catches and at least one of the second wire catches are generally parallelepiped.

14. The shape memory alloy wire actuator according to claim 9, further comprising a pair of electrically conductive terminations, the strand of shape memory alloy wire having a pair of opposite free ends, each one of the terminations being connected to a respective one of the free ends of the strand of shape memory alloy wire, one of the first wire catches or the second wire catches comprising a pair of holes electrically insulated from one another, each one of the holes being sized and adapted to receive and retain a respective one of the terminations.

15. The shape memory alloy wire actuator according to claim 1, wherein the first and second body members are generally cylindrically shaped, each one of the first and second body members having an end surface disposed opposite one another, and further comprising a first anchor element connected to the end surface of the first body member and a second anchor element connected to the end surface of the second body member.

16. The shape memory alloy wire actuator according to claim 15, wherein at least one of the first and second anchor elements is formed as an eyelet for securing the actuator to a device to be actuated.

17. The shape memory alloy wire actuator according to claim 1, wherein the strand of shape memory alloy wire is Nitinol.

18. The shape memory alloy wire actuator according to claim 1, including a source of electrical energy for energizing the strand of shape memory alloy wire.

19. The shape memory alloy wire actuator according to claim 1, wherein the strand of shape memory alloy wire comprises at least three segments extending between the body members in a serpentine manner.

20. The shape memory alloy wire actuator according to claim 1, wherein the strand of shape memory alloy wire comprises between four and eight segments extending between the body members in a serpentine manner.

21. A shape memory alloy wire actuator, comprising:

a first body member and a second body member extending along a longitudinal axis, the first and second body members being movable relative to one another along the longitudinal axis between an extended state and a contracted state; and a single strand of shape memory alloy wire interconnecting the first and second body members with at least three segments of the wire extending between the first and second body members such that when the shape memory alloy wire is energized, each segment of the single strand changes length causing the first body member and the second body member to move relative to one another in one longitudinal direction, and when the shape memory alloy wire is de-energized, each segment of the single strand changes length causing the first body member and the second body member to move relative to one another in a longitudinal direction opposite the one longitudinal direction.

22. The shape memory alloy wire actuator according to claim 21, including a resilient member disposed between the first and second body members so as to urge the body members away from one another.

23. The shape memory alloy wire actuator according to claim 1, wherein the strand of shape memory alloy wire comprises between four and eight segments extending between the body members in a serpentine manner.

* * * * *